(12) United States Patent
Mital et al.

(10) Patent No.: US 7,117,667 B2
(45) Date of Patent: *Oct. 10, 2006

(54) NOX ADSORBER AFTERTREATMENT SYSTEM FOR INTERNAL COMBUSTION ENGINES

(75) Inventors: Rahul Mital, Columbus, IN (US); Bradlee J. Stroia, Columbus, IN (US); Scott Cole, Columbus, IN (US)

(73) Assignee: Fleetguard, Inc., Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/651,055

(22) Filed: Aug. 28, 2003

(65) Prior Publication Data

US 2004/0037755 A1    Feb. 26, 2004

Related U.S. Application Data

(63) Continuation of application No. 10/192,897, filed on Jul. 11, 2002, now abandoned.

(51) Int. Cl.
*F01N 3/00*  (2006.01)

(52) U.S. Cl. .............. 60/286; 60/288; 60/297; 60/301; 60/303; 60/311

(58) Field of Classification Search .......... 60/287, 60/286, 288, 297, 300, 301, 311, 276, 295, 60/303
See application file for complete search history.

(56) References Cited

U.S. PATENT DOCUMENTS

| | | | | |
|---|---|---|---|---|
| 5,085,049 A | * | 2/1992 | Rim et al. ............ | 60/274 |
| 5,406,790 A | * | 4/1995 | Hirota et al. ......... | 60/276 |
| 5,613,359 A | * | 3/1997 | Zahn et al. ........... | 60/274 |
| 5,910,097 A | * | 6/1999 | Boegner et al. ...... | 60/278 |
| 5,974,791 A | * | 11/1999 | Hirota et al. ......... | 60/276 |
| 6,023,929 A | * | 2/2000 | Ma ........................ | 60/295 |
| 6,105,365 A | * | 8/2000 | Deeba et al. .......... | 60/274 |
| 6,170,259 B1 | * | 1/2001 | Boegner et al. ...... | 60/286 |
| 6,233,927 B1 | * | 5/2001 | Hirota et al. ......... | 60/297 |
| 6,293,096 B1 | * | 9/2001 | Khair et al. ........... | 60/286 |
| 6,318,073 B1 | * | 11/2001 | Boegner et al. ...... | 60/274 |
| 6,502,391 B1 | * | 1/2003 | Hirota et al. ......... | 60/288 |

FOREIGN PATENT DOCUMENTS

| | | | |
|---|---|---|---|
| JP | 60-045711 | * | 3/1985 |
| JP | 6-33735 | * | 2/1994 |

* cited by examiner

*Primary Examiner*—Thomas Denion
*Assistant Examiner*—Diem Tran
(74) *Attorney, Agent, or Firm*—Krieg Devault LLP

(57) ABSTRACT

The present invention provides for an NOx adsorber aftertreatment system for internal combustion engines which utilizes a parallel arrangement of an adsorber catalyst and a bypass. The exhaust flow from the engine is routed through the adsorber during lean operation. At a predetermined regeneration time (for example, when the adsorber catalyst is 20% full), the exhaust gas flow is reduced through the parallel leg that contains the adsorber catalyst to be regenerated (e.g., 20% through the catalyst leg, 80% of the flow to the bypass leg). A quantity of hydrocarbon is injected into the reduced-flow catalyst leg in order to make the mixture rich. Since the flow has been reduced in this leg, only a small fraction of the amount of hydrocarbon that would have been required to make the mixture rich during full flow is required. This will result in a substantial reduction in the fuel penalty incurred for regeneration of the adsorber catalyst. Once the leg has been regenerated, the exhaust flow is switched to flow 100% through the adsorber leg.

37 Claims, 7 Drawing Sheets

NOX ADSORBER AFTERTREATMENT SYSTEM FOR INTERNAL COMBUSTION ENGINES

CROSS-REFERENCE TO RELATED APPLICATIONS

The present application is a continuation application of U.S. application Ser. No. 10/192,897, filed Jul. 11, 2002 now abandoned, the text and drawings of which are hereby incorporated by reference in its entirety.

TECHNICAL FIELD OF THE INVENTION

The present invention generally relates to internal combustion engines and, more particularly, to an NOx adsorber aftertreatment system for internal combustion engines.

BACKGROUND OF THE INVENTION

As environmental concerns have led to increasingly strict regulation of engine emissions by governmental agencies, reduction of nitrogen-oxygen compounds (NOx) in exhaust emissions from internal combustion engines has become increasingly important. Current indications are that this trend will continue.

Future emission levels of diesel engines will have to be reduced in order to meet Environmental Protection Agency (EPA) regulated levels. In the past, the emission levels of U.S. diesel engines have been regulated according to the EPA using the Federal Test Procedure (FTP) cycle, with a subset of more restrictive emission standards for California via the California Air Resources Board (CARB). For example, the Tier II emission standards, which are being considered for 2004, are 50% lower than the Tier I standards. Car and light truck emissions are measured over the FTP 75 test and expressed in gm/ml. Proposed Ultra-Low Emissions Vehicle (ULEV) emission levels for light-duty vehicles up to model year 2004 are 0.2 gm/ml NOx and 0.08 gm/ml particulate matter (PM). Beginning with the 2004 model year, all light-duty Low Emission Vehicles (LEVs) and ULEVs in California would have to meet a 0.05 gm/ml NOx standard to be phased in over a three year period. In addition to the NOx standard, a full useful life PM standard of 0.01 gm/ml would also have to be met.

Traditional methods of in-cylinder emission reduction techniques such as exhaust gas recirculation (EGR) and injection rate shaping by themselves will not be able to achieve these low emission levels required by the standard. Aftertreatment technologies will have to be used, and will have to be further developed in order to meet the future low emission requirements of the diesel engine.

Some promising aftertreatment technologies to meet future NOx emission standards include lean NOx catalysts, Selective Catalytic Reduction (SCR) catalysts, and Plasma Assisted Catalytic Reduction (PACR). Current lean NOx catalyst technologies will result in the reduction of engine out NOx emissions in the range of 10 to 30 percent for typical conditions. Although a promising technology, SCR catalyst systems require an additional reducing agent (aqueous urea) that must be stored in a separate tank, which opens issues of effective temperature range of storage (to eliminate freezing) as well as distribution systems that must be constructed for practical use of this technology. PACR is similar to lean NOx in terms of reduction efficiency but is more expensive due to plasma generator. These technologies, therefore, have limitations which may prevent their use in achieving the new emissions requirements.

NOx adsorber catalysts have the potential for great NOx emission reduction (60–90%). The NOx adsorber is one of the most promising NOx reduction technologies. During lean-burn operation of the engine, the trap adsorbs nitrogen oxide in the form of stable nitrates. Under stoiciometric or rich conditions, the nitrate is thermodynamically unstable and the stored nitrogen oxides are released and subsequently catalytically reduced. Therefore, the operation cycle alternates between lean and rich conditions around the catalyst. During lean operation the catalyst stores the NOx and during rich operation the NOx is released and reduced to $N_2$. However, to make the conditions around the catalyst rich, a significant amount of hydrocarbon (HC) needs to be injected. The amount of HC required for reduction is only a small fraction of the total hydrocarbon injected, resulting in a significant fuel penalty. If the HC required to make conditions rich can be reduced, the fuel penalty can be brought down substantially.

An additional problem is the need for a diesel oxidation catalyst downstream from the NOx adsorber. The diesel oxidation catalyst oxidizes any unburned hydrocarbon that slips through the adsorber before the exhaust gases are released to the atmosphere. The need for a diesel oxidation catalyst negatively affects system cost and system package size.

Furthermore, some diesel engines include a catalytic soot filter to trap the soot generated by the engine. This soot is carcinogenic to living beings. Such catalytic soot filters often become clogged with the trapped particulate matter owing to the fact that they require high temperatures to regenerate. It is difficult to attain these high temperatures in the engine exhaust stream at low loads.

There is therefore a need for an engine aftertreatment system employing an NOx adsorber which reduces the fuel penalty associated with these devices, allows for regeneration of the soot filter, even at low loads, and reduces the system cost and package size. The present invention is directed toward meeting this need.

SUMMARY OF THE INVENTION

The present invention provides for an NOx adsorber aftertreatment system for internal combustion engines which utilizes a parallel arrangement of an adsorber catalyst and a bypass. The exhaust flow from the engine is routed through the adsorber during lean operation. At a predetermined regeneration time (for example, when the adsorber catalyst is 20% full), the exhaust gas flow is reduced through the parallel leg that contains the adsorber catalyst to be regenerated (e.g., 20% through the catalyst leg, 80% of the flow to the bypass leg). A quantity of hydrocarbon is injected into the reduced-flow catalyst leg in order to make the mixture rich. Since the flow has been reduced in this leg, only a small fraction of the amount of hydrocarbon that would have been required to make the mixture rich during full flow is required. This will result in a substantial reduction in the fuel penalty incurred for regeneration of the adsorber catalyst. Once the leg has been regenerated, the exhaust flow is switched to flow 100% through the adsorber leg.

In one embodiment, a catalytic soot filter is positioned upstream from the adsorber. The additional hydrocarbon used to promote regeneration is injected into the catalytic soot filter. The catalytic soot filter, when used in combination with the adsorber, provides more time and surface area for the hydrocarbon to react with the oxygen. The catalytic soot filter will additionally reformulate some of the diesel fuel into hydrogen and carbon monoxide, which have been shown to be better reductants than diesel fuel.

In another embodiment, a catalytic soot filter is positioned downstream from the adsorber. The heat generated by the regenerating adsorber is transferred downstream to the soot filter, thereby heating the soot filter above the temperature required for regeneration. Additionally, any hydrocarbon that slips through the adsorber is burned in the catalytic soot filter, further raising the temperature. Such burning of the hydrocarbon slip in the catalytic soot filter obviates the need for a diesel oxidation catalyst, thereby reducing system cost and package size.

In another embodiment, a catalytic soot filter is positioned upstream from the sulfur trap. The soot filter converts $SO_2$ to $SO_3$, which is more readily trapped by the sulfur trap.

In one form of the invention, an internal combustion engine aftertreatment system for treating exhaust gases exiting an engine is disclosed, the system comprising a sulfur trap having a sulfur trap input operatively coupled to the engine exhaust and having a sulfur trap output, a catalytic soot filter having a soot filter input operatively coupled to the sulfur trap output and having a soot filter output, a valve system having a valve input operatively coupled to the soot filter output, a first valve output and having a second valve output, an adsorber having an adsorber input operatively coupled to the first valve output and having an adsorber output, a bypass pathway having a bypass input operatively coupled to the second valve output and having a bypass output operatively coupled to the adsorber output, and a diesel oxidation catalyst having a DOC input operatively coupled to the adsorber output and to the bypass output and having a DOC output.

In another form of the invention, an internal combustion engine aftertreatment system for treating exhaust gases exiting an engine is disclosed, the system comprising a valve system having a valve input operatively coupled to the engine exhaust, a first valve output and having a second valve output, an adsorber having an adsorber input operatively coupled to the first valve output and having an adsorber output, and a bypass pathway having a bypass input operatively coupled to the second valve output and having a bypass output operatively coupled to the adsorber output.

In another form of the invention, an internal combustion engine aftertreatment system for treating exhaust gases exiting an engine is disclosed, the system comprising a valve system having a valve input operatively coupled to the engine exhaust, a first valve output and having a second valve output, a catalytic soot filter having a soot filter input operatively coupled to the valve system output and having a soot filter output, an adsorber having an adsorber input operatively coupled to the soot filter output and having an adsorber output, and a bypass pathway having a bypass input operatively coupled to the second valve output and having a bypass output operatively coupled to the adsorber output.

In another form of the invention, an internal combustion engine aftertreatment system for treating exhaust gases exiting an engine is disclosed, the system comprising a valve system having a valve input operatively coupled to the engine exhaust, a first valve output and having a second valve output, an adsorber having an adsorber input operatively coupled to the first valve output and having an adsorber output, a bypass pathway having a bypass input operatively coupled to the second valve output and having a bypass output, and a catalytic soot filter having a soot filter input operatively coupled to the adsorber output and the bypass output and having a soot filter output.

In another form of the invention, an internal combustion engine aftertreatment system for treating exhaust gases exiting an engine, the system comprising a catalytic soot filter having a soot filter input operatively coupled to the engine exhaust and having a soot filter output, a sulfur trap having a sulfur trap input operatively coupled to the filter output and having a sulfur trap output, a valve system having a valve input operatively coupled to the sulfur trap output, a first valve output and having a second valve output, an adsorber having an adsorber input operatively coupled to the first valve output and having an adsorber output, a bypass pathway having a bypass input operatively coupled to the second valve output and having a bypass output operatively coupled to the adsorber output, and a diesel oxidation catalyst having a DOC input operatively coupled to the adsorber output and to the bypass output and having a DOC output.

DETAIL DESCRIPTION OF THE PREFERRED EMBODIMENTS

Figure 1:
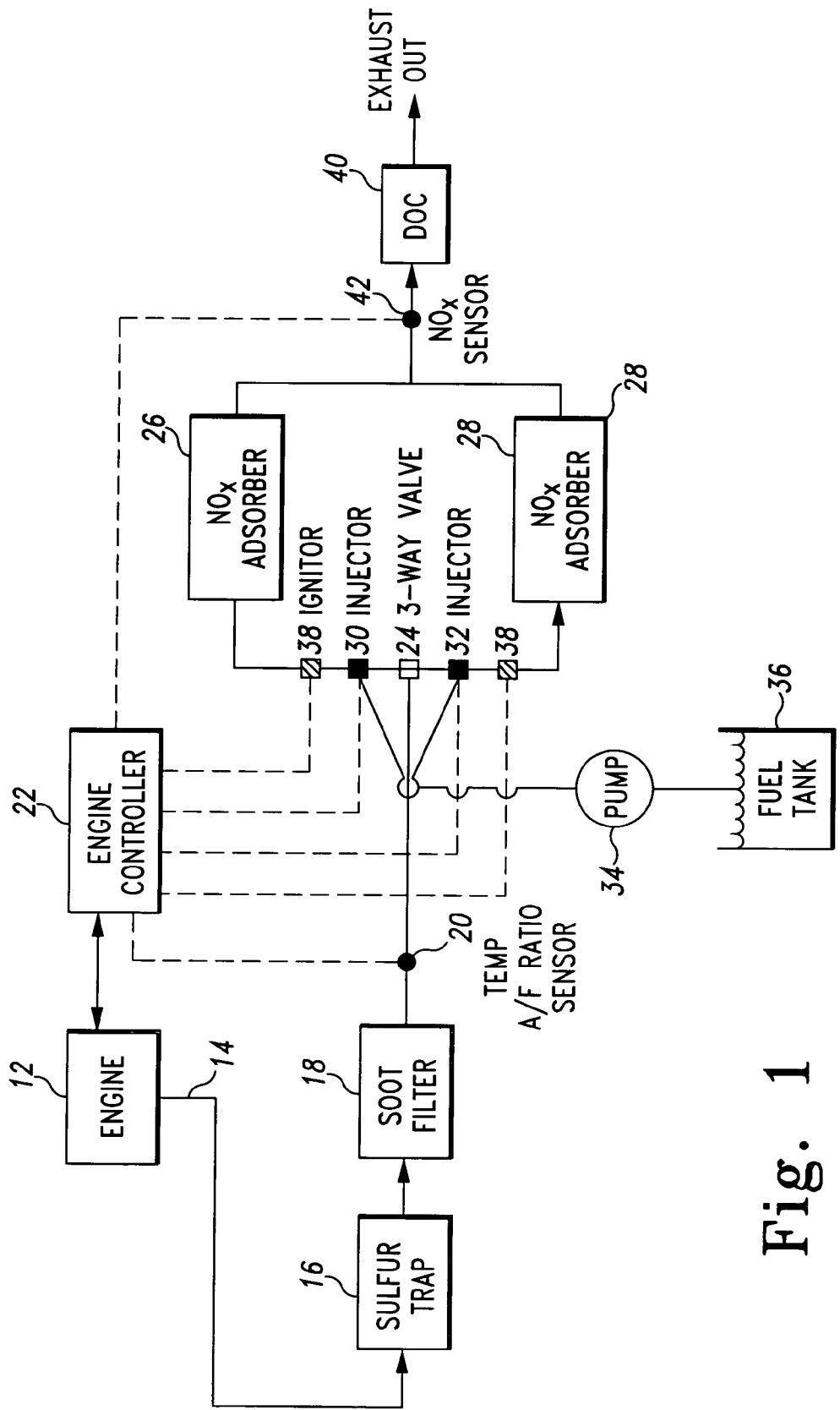
FIG. 1 is a schematic block diagram of a first preferred embodiment system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Referring to FIG. 1, there is illustrated a schematic block diagram of a first preferred embodiment of the present invention. The system is designed to remove NOx compounds from the exhaust stream of an internal combustion engine 12, such as a diesel engine. The exhaust produced by the engine 12 exits the exhaust manifold 14 of the engine and is passed through an optional sulfur trap 16. NOx adsorber catalysts are extremely sensitive to the level of sulfur in the fuel. The fuel and the lubrication oil of the engine contain sulfur and therefore sulfur-oxygen compounds (SOx) are contained in the exhaust gas. This SOx is adsorbed into the NOx adsorber and reduces its capacity. Unlike NOx, SOx does not regenerate under rich conditions within the operating temperature range of the engine. Eventually the adsorber is filled up with sulfate and becomes inactive. The optional sulfur trap 16 may therefore be used to trap SOx compounds before they reach the NOx adsorbers downstream.

The output of the sulfur trap 16 may be passed through an optional catalytic soot filter 18 in order to trap any diesel soot particulate matter that may be entrained in the exhaust gases. In addition to trapping diesel soot particulate matter by physical filtering, the catalytic soot filter also acts as a flow-through oxidation catalyst by the addition of precious metal catalysts which reduce the volatile organic fraction of the soot material by the catalyzed oxidation reaction (e.g. C+Oxidant→CO). A sensor 20 may be placed at the output of the soot filter 18 in order to measure the temperature and air/fuel (A/F) ratio (lambda) of the exhaust stream. The output of the optional sensor 20 is provided to an electronic engine control module 22.

The engine controller 22 is additionally coupled to the engine 12 for reading various engine sensor data, such as engine position sensor data, speed sensor data, air mass flow sensor data, fuel rate data, etc., as is known in the art. The engine controller 22 may further provide data to the engine 12 in order to control the operating state of the engine 12, as is well known in the art.

The flow of exhaust leaving the soot filter 18 is controlled by a proportional control 3-way valve 24. As is known in the art, a proportional control 3-way valve may be used to divide the flow of a gas stream into two separate paths, wherein the percentage of the total gas flow being directed to either path is controllable. In the embodiment of FIG. 1, the proportional control 3-way valve 24 is coupled to the engine controller 22 in order to control the relative proportions of exhaust gas flow routed to either output of the valve 24.

The two outputs of the valve 24 are coupled to the respective inputs of a pair of NOx adsorbers (catalytic converters) 26 and 28. Therefore, by providing control signals from the engine controller 22 to the proportional control 3-way valve 24, the percentage of the total exhaust flow from the engine 14 entering either the adsorber 26 or the adsorber 28 may be precisely controlled. A fuel injector 30 is positioned to inject a measured quantity of fuel (hydrocarbon) into the exhaust gas flow entering the adsorber 26. Similarly, a second fuel injector 32 is positioned to inject a quantity of fuel into the exhaust gas flow entering adsorber 28. Both injectors 30, 32 are controlled by the engine controller 22 and are supplied with fuel from a pump 34 supplied by the vehicle fuel tank 36. Preferably, the fuel pump 34 is a low-cost diaphragm-type fuel pump. Two igniters 38 are provided to ignite the fuel being injected by the injectors 30, 32 under the control of the engine controller 22.

Because the exhaust flow is reduced in the adsorber leg being regenerated, the amount of reductant required to burn off the oxygen reduces. The concentration of reductant required for reduction remains the same, but this amount is a small fraction of the total reductant during full exhaust flow. It will be appreciated that any flow ratios may be utilized during reduction and regeneration and during normal flow, even though exemplary flows are used herein for illustrative purposes. The optimum flow ratios for any given system will depend upon the particular system configuration.

The exhaust gases exiting the adsorbers 26 and 28 are combined together before being input to an optional diesel oxidation catalyst 40. Due to the pulse injection of relatively large quantities of reductant (normally hydrocarbon) for short periods during regeneration of the NOx adsorbers 26, 28 of the present invention, some unburned hydrocarbon can slip through the adsorber catalyst. The use of a diesel oxidation catalyst 40 downstream of the adsorbers 26, 28 virtually eliminates hydrocarbon emission from the tailpipe. Such catalysts contain precious metals in them that reduce the activation energy of hydrocarbon combustion, such that the unburned hydrocarbon is oxidized to carbon dioxide and water. The exhaust gases exiting the diesel oxidation catalyst 40 may then exit the vehicle. An optional NOx sensor 42 may be placed between the adsorbers 26, 28 and the diesel oxidation catalyst 40 in order to directly measure the NOx levels leaving the adsorbers 26 and 28. The output of the optional NOx sensor 42 is provided to the engine controller 22.

Figure 2:
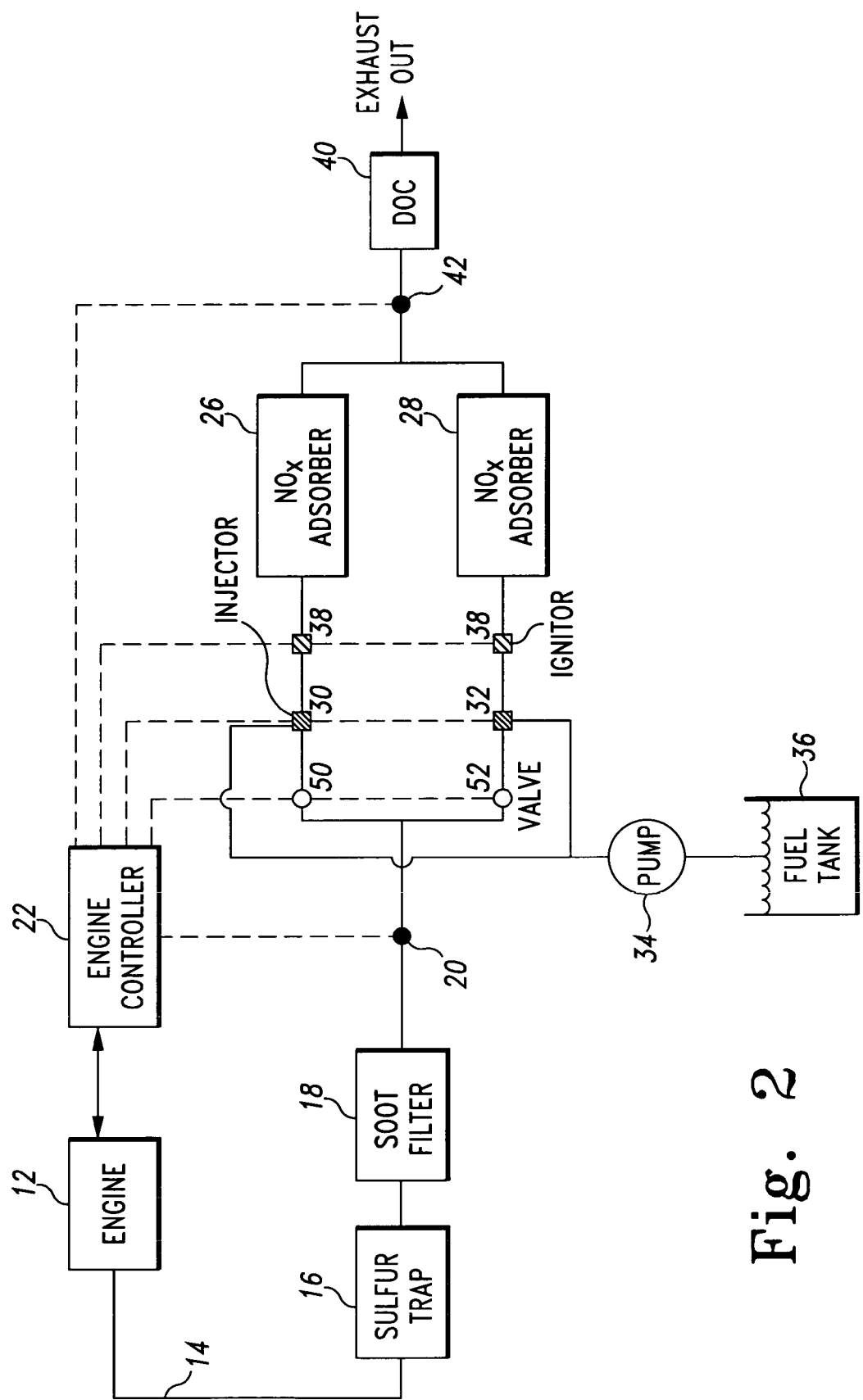
FIG. 2 is a schematic block diagram of a second preferred embodiment system of the present invention.

Referring now to FIG. 2, there is illustrated a second preferred embodiment of the present invention. The second embodiment of the present invention is similar to the first embodiment illustrated in FIG. 1, and like reference designators refer to like components. In the second embodiment, the proportional control 3-way valve is replaced with a pair of two-way valves 50 and 52. Valve 50 controls the flow of exhaust gases into the adsorber 26, while valve 52 controls the flow of exhaust gases into adsorber 28. Each of the valves 50, 52 is coupled to the engine controller 22 for control thereby.

The valves 50, 52 may comprise either variable flow rate control valves or may comprise valves having a fixed number of flow rate settings. For example, if the aftertreatment system design dictates that the relative flow between adsorbers 26, 28 will always be 20–80 during regeneration, then the valves 50, 52 may have discrete settings that will allow the engine controller 22 to switch them between reduced flow (20%) and max flow (80%) settings in order to achieve the desired flow reduction in one of the adsorbers 26, 28. Optionally, the valves 50, 52 may have variably adjustable flow rates, such that the engine controller 22 can infinitely adjust the flow percentage through each valve 50, 52 in order to divide the exhaust flow between the adsorbers 26, 28 in any desired proportion.

Figure 3:
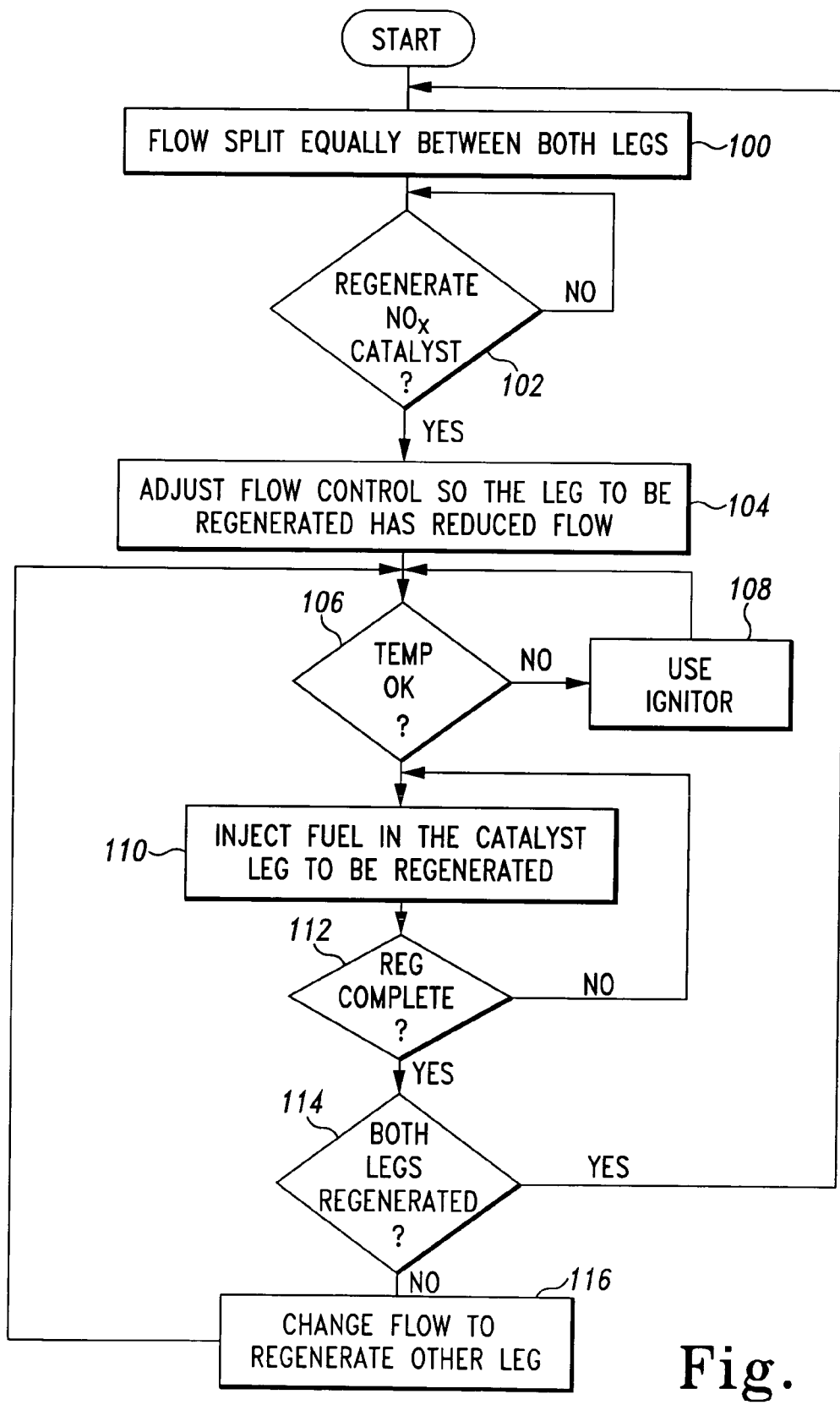
FIG. 3 is a process flow diagram illustrating a preferred embodiment process of the present invention.

Referring now to FIG. 3, there is illustrated a preferred embodiment process of the present invention. The process begins at step 100, which represents the steady state operation of the engine with exhaust gas flow split evenly between the adsorbers 26 and 28. At step 102, the engine controller 22 determines whether either of the adsorber 26, 28 catalysts need be regenerated. The decision made at step 102 can be made under open-loop control, by using stored catalyst adsorption maps in the engine controller 22. These catalyst adsorption maps may be predetermined using empirical data from laboratory tests utilizing the same or similar engine and exhaust system. The regeneration decision at step 102 may also be made under closed-loop control, wherein the engine controller 22 examines the data being produced by the NOx sensor 42 which is proportional to the level of NOx being emitted at the output of the adsorbers 26, 28.

If step 102 determines that the adsorbers 26, 28 need to be regenerated (e.g. the adsorption efficiency has dropped to 80%), then the process continues at step 104 in which the flow of exhaust through the system is controlled such that the adsorber to be regenerated receives a reduced level of exhaust flow. For example, if the engine controller 22 determines that adsorber 26 needs to be regenerated, then the flow of exhaust through the adsorber 26 can be reduced to 20% of the total exhaust flow, with the remaining 80% being routed through the adsorber 28. The relative proportions of exhaust flow routed to either adsorber will depend upon various system design parameters. The 20–80 split discussed herein is for illustrative purposes only.

Control of the relative flow of exhaust gases through adsorbers 26 and 28 is performed under control of the engine controller 22 (for example, based upon the engine sensor parameters being sent to the controller 22 (engine position sensor, speed sensor, air mass flow sensor, fuel rate, etc.)) through operation of either the proportional control 3-way valve 24 of the system of FIG. 1 or through control of the dual 2-way valves 50, 52 of the system of FIG. 2, which are adjusted to achieve the correct predetermined exhaust flow velocity needed for regeneration of the aftertreatment system.

Once the correct flow velocity has been achieved through each of the adsorbers 26, 28, the process moves to step 106 in which the engine controller 22 determines the temperature and air/fuel ratio of the regeneration exhaust stream using the sensor 20. If the temperature of the exhaust stream is sufficient for regeneration of the catalysts (according to a predetermined temperature limit), then the process continues to step 110. If step 106 determines that the temperature of the regeneration exhaust stream needs to be raised, then the process continues at step 108 in which the engine controller 22 causes the igniter 38 to be activated in order to ensure ignition of the regeneration fuel injection.

At step 110, the fuel injector 30, 32 in the leg being regenerated is used to inject the required amount of fuel into the exhaust stream as a reductant to completely regenerate the catalysts within the adsorber. The injectors 30, 32 are controlled by the engine controller 22. The exhaust fuel injector 30, 32 is used to achieve a rich air/fuel ratio (lambda less than 1.0) in the regeneration stream. Because of the reduced amount of exhaust gas flowing through the regeneration leg, the quantity of fuel needed to be injected by the injector 30, 32 is greatly reduced, thereby significantly reducing the fuel penalty associated with adsorber regeneration. This injected fuel will be ignited by the temperature of the exhaust gas stream (possibly supplemented by the igniter 38) in order to facilitate regeneration of the adsorber.

Once regeneration of the leg is determined to be complete at step 112 (e.g. after a predetermined amount of time has elapsed), the process continues at step 114, where the engine controller 22 determines if both legs of the system have been regenerated. If they have not, then the process continues at step 116, where the engine controller 22 operates either the proportional control 3-way valve 24 or the 2-way valves 50, 52 in order to route the majority of the exhaust gas flow to the recently regenerated leg and to reduce the amount of exhaust gases flowing through the leg which is to be regenerated. The process is then returned to step 106 in order to regenerate the next leg. If, on the other hand, step 114 determines that both legs have been regenerated, then the process is returned to step 100 where the engine controller 22 operates the proportional control 3-way valve 24 or the 2-way valves 50, 52 in order to evenly split the exhaust gas flow through the adsorbers 26, 28.

As detailed hereinabove, the adsorber regeneration cycle switches back and forth between the two sides of the exhaust as necessary in order to keep the outlet exhaust stream purified of excessive emissions. It will be appreciated that since dual exhaust streams are being utilized, the regeneration cycle of the adsorber does not necessarily have to be short. During the entire time that the adsorber is being regenerated, the second adsorber is available for cleaning the majority of the exhaust gas stream. It should also be noted that the temperature of the regeneration exhaust gas stream may also be controlled by adjustment of the proportional control 3-way valve in conjunction with the igniter 38. By allowing slightly more exhaust gas to pass into the regeneration side of the exhaust, the temperature thereof may be raised.

Besides the aforementioned advantages in adsorber regeneration, the arrangement of catalysts illustrated in FIGS. 1 and 2 of the present invention provides other benefits. Placing the catalytic soot filter 18 before the adsorbers 26, 28 helps in multiple ways. The catalytic soot filter 18 converts the NO in the exhaust stream to $NO_2$ which helps NOx storage in the adsorber 26, 28. The catalytic soot filter 18 also prevents particulate matter from clogging the adsorber system and it also helps increase the temperature of the exhaust stream in order to make the adsorber 26, 28 more efficient.

In another embodiment, the sulfur trap 16 may be placed downstream from the catalytic soot filter 18. By placing the catalytic soot filter 18 upstream of the sulfur trap 16, the catalytic soot filter 18 will convert $SO_2$ to $SO_3$, which is more readily trapped by the sulfur trap 16.

Therefore, the system illustrated and described herein is effective in addressing all legislatively-controlled emissions including NOx, SOx and hydrocarbons. The adsorbers are used for reduction of NOx levels and are more easily regenerated than in prior art systems. The sulfur trap removes sulfur from the exhaust, making the operation of the adsorber more efficient and longer lasting. The catalytic soot filter traps particulate soot from the exhaust stream. Finally, the diesel oxidation catalyst cleans up any leftover hydrocarbons exiting the adsorbers, thereby allowing the exhaust emitted by the system of the present invention to meet or exceed the requirements of the various legislative bodies.

Figure 4:
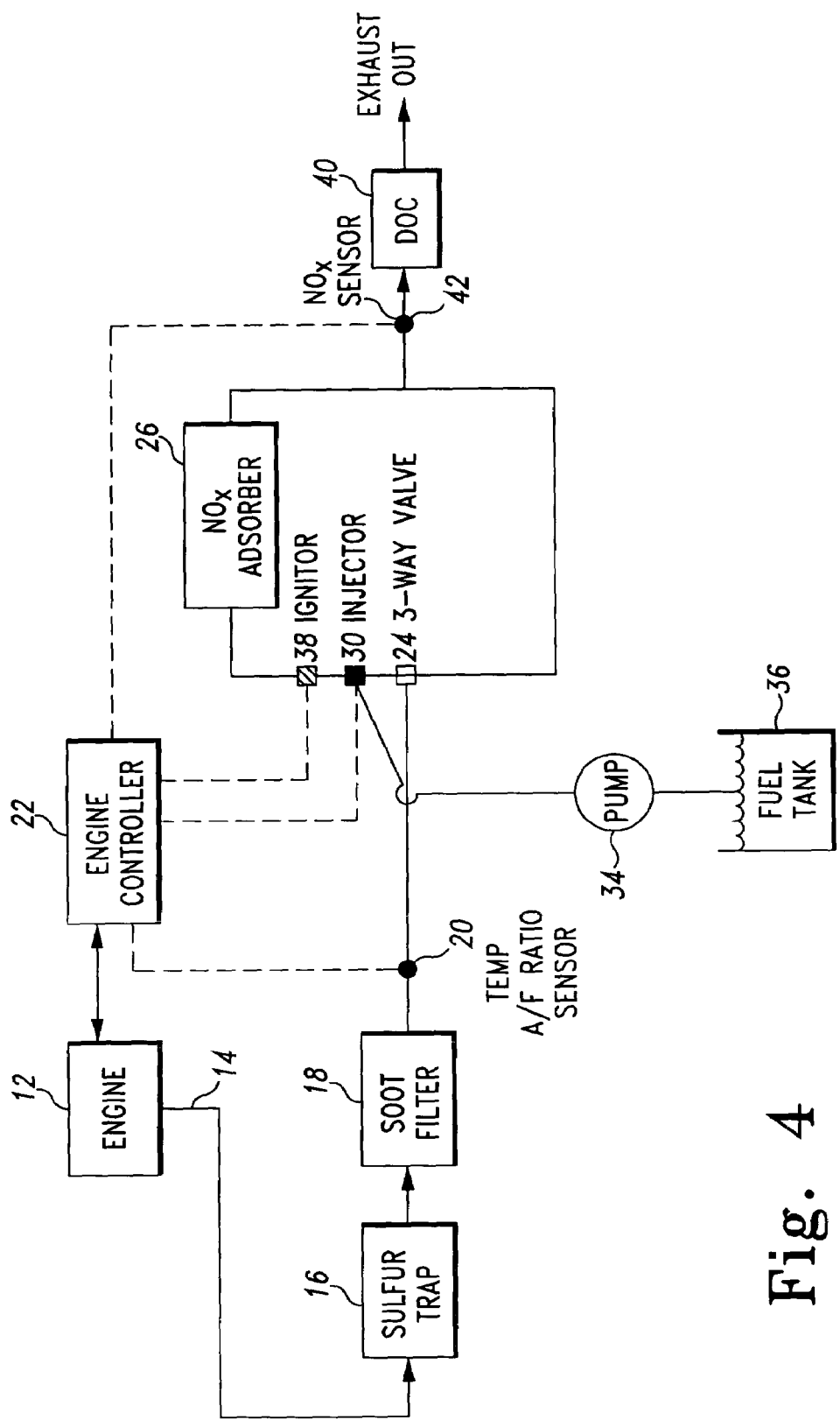
FIG. 4 is a schematic block diagram of a third preferred embodiment system of the present invention.

Referring now to FIG. 4, there is illustrated a third preferred embodiment of the present invention. The third embodiment of the present invention is similar to the first embodiment illustrated in FIG. 1, and like reference designators refer to like components. In the third embodiment, the adsorber 28 and injector 32 are replaced by a simple bypass tube 29. During lean operation of the engine 12, the entire exhaust flow is routed through the adsorber 26 under control of the 3-way valve 24. As in the first preferred embodiment, when the adsorber 26 efficiency falls to a predetermined level (e.g. 80% efficiency), the 3-way valve 24 is adjusted to route a majority of the exhaust flow through the bypass tube 29. As in the first preferred embodiment, the adsorber 26 may then be regenerated by the injection of hydrocarbon through the fuel injector 30.

After the adsorber 26 has been regenerated, the valve 24 is adjusted to route all of the exhaust flow through the adsorber 26. In this manner, the regeneration cycle can be switched back and forth between full flow through the adsorber 26 and partial adsorber bypass through the tube 29 in order to keep the outlet exhaust stream purified of excessive emissions. Since the bypass tube 29 contains no adsorber, the regeneration cycle needs to be kept short in order to keep NOx emissions to acceptable levels.

The third embodiment system of FIG. 4 has certain advantages over the first embodiment system. In the first embodiment system, the regeneration operation has to e performed twice in each cycle since there is a catalyst mounted in each leg. Use of the third embodiment system therefore leads to less injections of regeneration hydrocarbon and additional fuel savings. Of course, NOx is not stored in the bypass tube 29 during regeneration, thus the system efficiency of the third embodiment is slightly less than for the first and second embodiments. The third embodiment, however, has the advantage of less hardware by requiring one less adsorber, fuel injector and ignitor. The third embodiment also utilizes a simpler control strategy because of the need to regenerate only a single adsorber.

Figure 5:
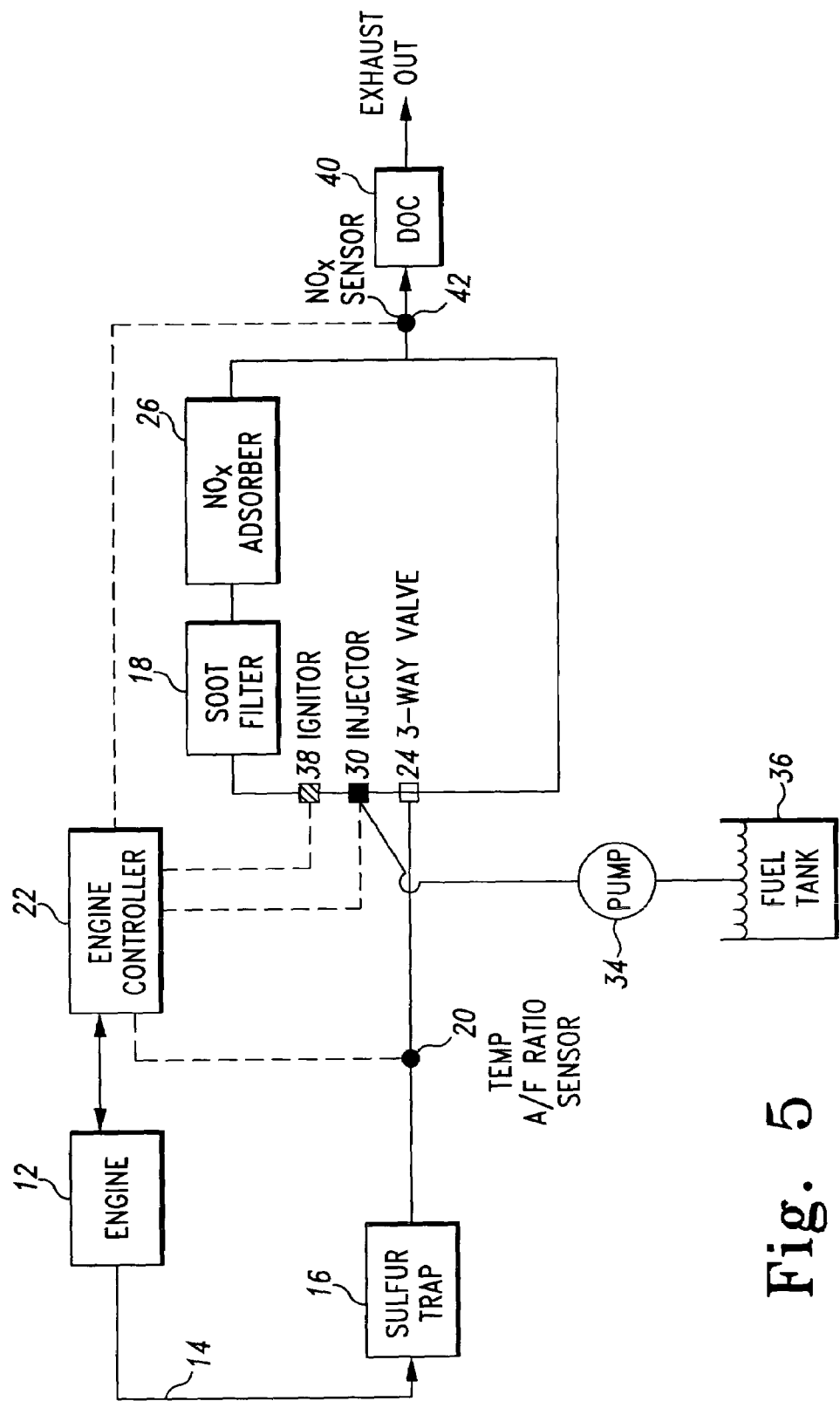
FIG. 5 is a schematic block diagram of a fourth preferred embodiment of the present invention.

Referring now to FIG. 5, there is illustrated a fourth preferred embodiment of the present invention. The fourth embodiment of the present invention is similar to the third embodiment illustrated in FIG. 4, and like reference designators refer to like components. In the fourth embodiment, the catalytic soot filter 18 is moved to a position upstream from the adsorber 26 and downstream of the fuel injector 30.

As discussed hereinabove, catalytic soot filters 18 require high temperatures in order to regenerate. It is difficult to attain these high temperatures in the exhaust stream during low load operation of the engine 12. Under these conditions, the soot filter 18 eventually becomes clogged with soot. By placing the soot filter 18 upstream from the adsorber 26 and downstream from the fuel injector 30 as shown in the fourth embodiment, the catalytic soot filter 18 also receives the injected hydrocarbon and is regenerated by combustion of this hydrocarbon. Placement of the catalytic soot filter 18 in this position also provides more time and surface area for the introduced hydrocarbon to react with oxygen, thereby more completely burning the hydrocarbon. More complete hydrocarbon combustion will possibly eliminate the need for the diesel oxidation catalyst 40, thereby reducing exhaust system cost and package size.

Furthermore, the catalytic soot filter 18 will reformulate some of the diesel fuel into hydrogen and carbon monoxide, which have been shown to be better reductants than diesel fuel. This improvement in reduction will result in more complete regeneration of the catalytic soot filter 18 and adsorber 26 and/or a shorter regeneration time.

Figure 6:
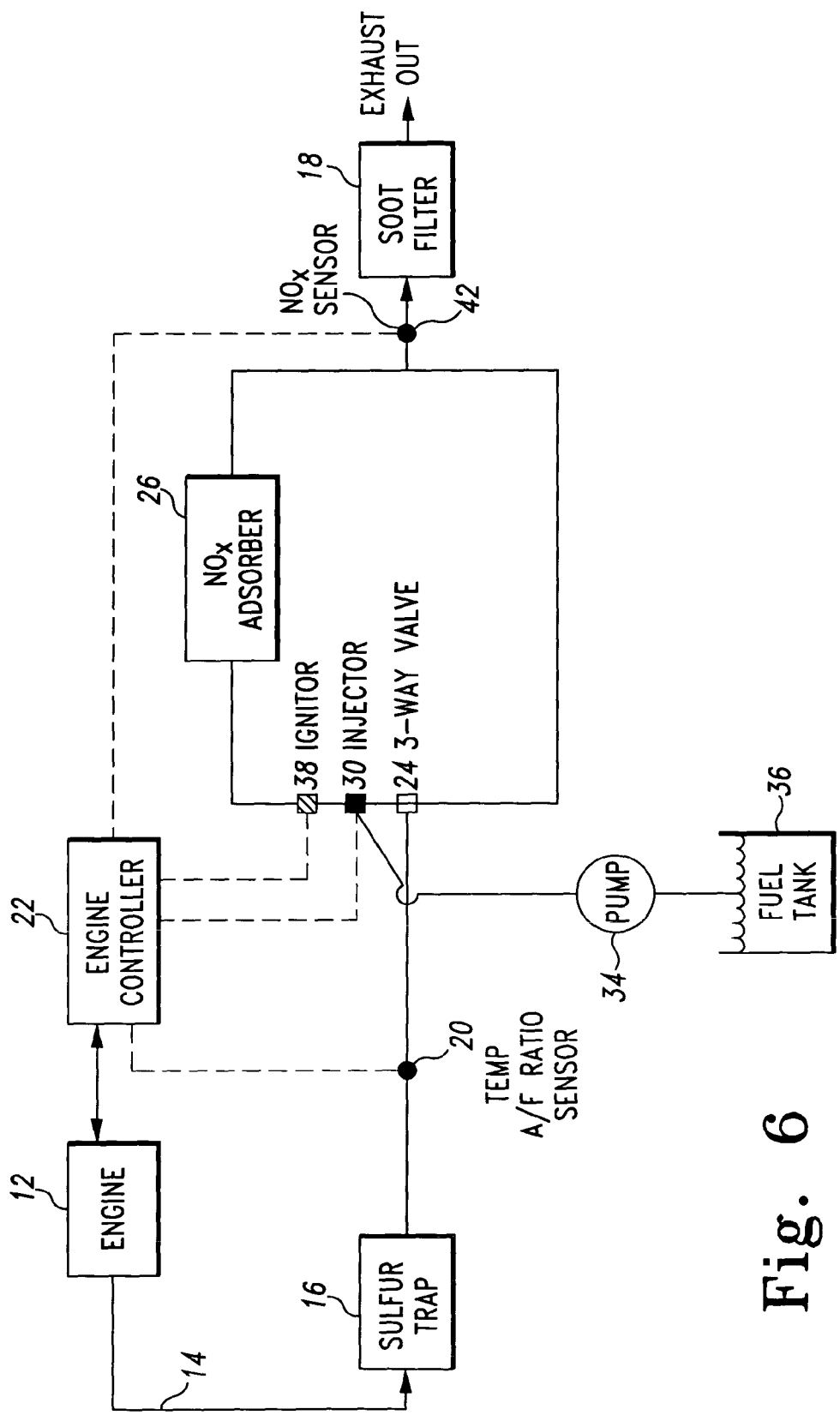
FIG. 6 is a schematic block diagram of a fifth preferred embodiment of the present invention.

Referring now to FIG. 6, there is illustrated a fifth preferred embodiment of the present invention. The fifth embodiment of the present invention is similar to the third embodiment illustrated in FIG. 4, and like reference designators refer to like components. In the fifth embodiment, the diesel oxidation catalyst 40 is removed from the system and the catalytic soot filter 18 is positioned downstream from the adsorber 26.

As discussed hereinabove, catalytic soot filter 18 requires high temperatures in order to regenerate. It is difficult to attain these high temperatures in the exhaust stream during low load operation of the engine 12. Under these conditions, the soot filter 18 eventually becomes clogged with soot. By placing the soot filter 18 downstream from the adsorber 26 as shown in the fifth embodiment, heat generated in the adsorber 26 due to the combustion of the introduced hydrocarbon serves to raise the temperature of the catalytic soot filter 18 sufficiently to accomplish regeneration.

Furthermore, any hydrocarbon that slips unburned through the adsorber 26 will oxidize in the soot filter 18, thereby generating further heat to encourage regeneration of the soot filter 18. Because the hydrocarbon slip is oxidized in the soot filter 18, the diesel oxidation catalyst 40 of the prior embodiments is no longer required. Elimination of the diesel oxidation catalyst 40 reduces the exhaust system cost and package size.

Figure 7:
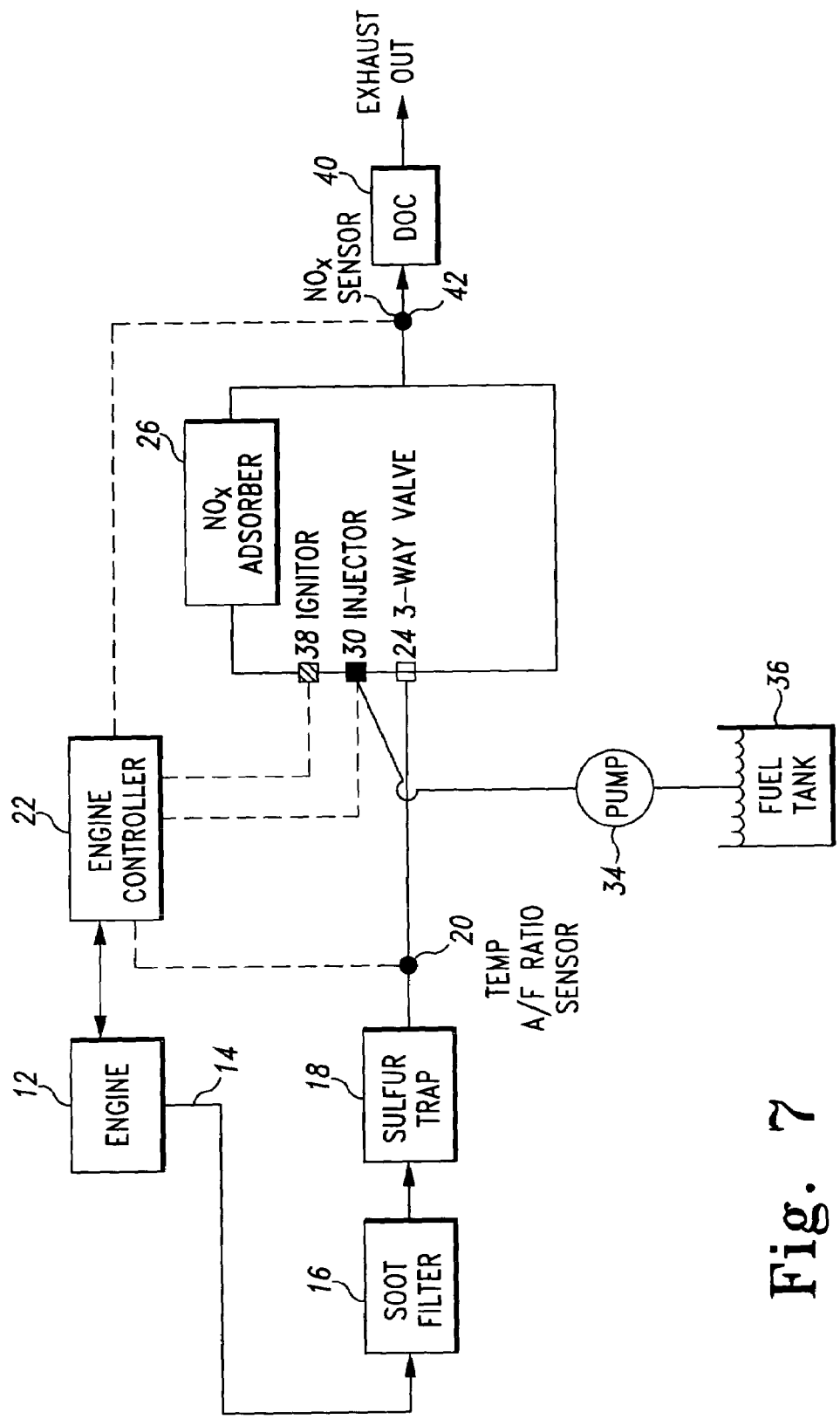
FIG. 7 is a schematic block diagram of a sixth preferred embodiment of the present invention.

Referring now to FIG. 7, there is illustrated a sixth preferred embodiment of the present invention. The sixth embodiment of the present invention is similar to the third embodiment illustrated in FIG. 4, and like reference designators refer to like components. In the sixth embodiment, the catalytic soot filter 18 is positioned upstream from the sulfur trap 16. Placement of the catalytic soot filter 18 in this position enhances the efficiency of the sulfur trap, as the soot filter converts $SO_2$ to $SO_3$, which is more readily trapped by the sulfur trap.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. An internal combustion engine aftertreatment system for treating exhaust gases exiting an engine, the system comprising:
   a sulfur trap having a sulfur trap input operatively coupled to the engine exhaust and having a sulfur trap output;
   a catalytic soot filter having a soot filter input operatively coupled to the sulfur trap output and having a soot filter output;
   a valve system having a valve input operatively coupled to the soot filter output, a first valve output and having a second valve output;
   an NOx adsorber having an adsorber input operatively coupled to the first valve output and having an adsorber output;
   a bypass pathway having a bypass input operatively coupled to the second valve output and having a bypass output operatively coupled to the adsorber output; and
   a diesel oxidation catalyst having a DOC input operatively coupled to the adsorber output and to the bypass output and having a DOC output.

2. An internal combustion engine aftertreatment system for treating exhaust gases exiting an engine, the system comprising:
   a valve system having a valve input operatively coupled to the engine exhaust, a first valve output and having a second valve output;
   an adsorber having an adsorber input operatively coupled to the first valve output and having an adsorber output;
   a bypass pathway having a bypass input operatively coupled to the second valve output and having a bypass output operatively coupled to the adsorber output;
   a sulfur trap having a sulfur trap input operatively coupled to the engine exhaust and having a sulfur trap output operatively coupled to the valve system input; and
   a catalytic soot filter having a soot filter input operatively coupled to the sulfur trap output and having a soot filter output operatively coupled to the valve system input.

3. The system of claim 2, further comprising:
   a diesel oxidation catalyst having a DOC input operatively coupled to the adsorber output and to the bypass output and having a DOC output.

4. The system of claim 2, further comprising:
   a temperature and lamda sensor having a sensor input operatively coupled to the valve system input.

5. The system of claim 2, further comprising:
   an NOx sensor having an NOx sensor input operatively coupled to the adsorber output.

6. The system of claim 2, wherein the valve system comprises a proportional control 3-way valve.

7. The system of claim 2, further comprising:
   a supply of fuel;
   a pump having a pump inlet operatively coupled to the supply of fuel and having a pump outlet;
   a fuel injector having an injector input operatively coupled to the pump outlet and having an injector output operatively coupled to the adsorber input.

8. The system of claim 7, further comprising:
   an igniter operatively coupled to the adsorber input.

9. An internal combustion engine aftertreatment system for treating exhaust gases exiting an engine, the system comprising:

a valve system having a valve input operatively coupled to the engine exhaust a first valve output and having a second valve output;

a catalytic soot filter having a soot filter input operatively coupled to the valve system output and having a soot filter output;

an adsorber having an adsorber input operatively coupled to the soot filter output and having an adsorber output;

a bypass pathway having a bypass input operatively coupled to the second valve output and having a bypass output operatively coupled to the adsorber output; and a sulfur trap having a sulfur trap input operatively coupled to the engine exhaust and having a sulfur trap output operatively coupled to the valve system input.

10. The system of claim 9, further comprising:
a diesel oxidation catalyst having a DOC input operatively coupled to the adsorber output and to the bypass output and having a DOC output.

11. The system of claim 9, further comprising:
an NOx sensor having an NOx sensor input operatively coupled to the adsorber output.

12. The system of claim 9, wherein the valve system comprises a proportional control 3-way valve.

13. The system of claim 9, further comprising:
a supply of fuel;
a pump having a pump inlet operatively coupled to the supply of fuel and having a pump outlet;
a fuel injector having an injector input operatively coupled to the pump outlet and having an injector output operatively coupled to the soot filter input.

14. The system of claim 13, further comprising:
an igniter operatively coupled to the soot filter input.

15. An internal combustion engine aftertreatment system for treating exhaust gases exiting an engine, the system comprising:
a valve system having a valve input operatively coupled to the engine exhaust, a first valve output and having a second valve output;
a catalytic soot filter having a soot filter input operatively coupled to the valve system output and having a soot filter output;
an adsorber having an adsorber input operatively coupled to the soot filter output and having an adsorber output;
a bypass pathway having a bypass input operatively coupled to the second valve output and having a bypass output operatively coupled to the adsorber output; and
a temperature and lamda sensor having a sensor input operatively coupled to the valve system input.

16. An internal combustion engine aftertreatment system for treating exhaust gases exiting an engine, the system comprising:
a valve system having a valve input operatively coupled to the engine exhaust, a first valve output and having a second valve output;
an adsorber having an adsorber input operatively coupled to the first valve output and having an adsorber output;
a bypass pathway having a bypass input operatively coupled to the second valve output and having a bypass output;
a catalytic soot filter having a soot filter input operatively coupled to the adsorber output and the bypass output and having a soot filter output; and
a sulfur trap having a sulfur trap input operatively coupled to the engine exhaust and having a sulfur trap output operatively coupled to the valve system input.

17. The system of claim 16, further comprising:
a temperature and lamda sensor having a sensor input operatively coupled to the valve system input.

18. The system of claim 16, further comprising:
an NOx sensor having an NOx sensor input operatively coupled to the adsorber output.

19. The system of claim 16, wherein the valve system comprises a proportional control 3-way valve.

20. The system of claim 16, further comprising:
a supply of fuel;
a pump having a pump inlet operatively coupled to the supply of fuel and having a pump outlet;
a fuel injector having an injector input operatively coupled to the pump outlet and having an injector output operatively coupled to the adsorber input.

21. The system of claim 20, further comprising:
an igniter operatively coupled to the adsorber input.

22. An internal combustion engine aftertreatment system for treating exhaust gases exiting an engine, the system comprising:
a catalytic soot filter having a soot filter input operatively coupled to the engine exhaust and having a soot filter output;
a sulfur trap having a sulfur trap input operatively coupled to the filter output and having a sulfur trap output;
a valve system having a valve input operatively coupled to the sulfur trap output, a first valve output and having a second valve output;
an NOx adsorber having an adsorber input operatively coupled to the first valve output and having an adsorber output;
a bypass pathway having a bypass input operatively coupled to the second valve output and having a bypass output operatively coupled to the adsorber output; and
a diesel oxidation catalyst having a DOC input operatively coupled to the adsorber output and to the bypass output and having a DOC output.

23. The system of claim 22, further comprising:
a temperature and lamda sensor having a sensor input operatively coupled to the valve system input.

24. The system of claim 22, further comprising:
an NOx sensor having an NOx sensor input operatively coupled to the adsorber output.

25. The system of claim 22, wherein the valve system comprises a proportional control 3-way valve.

26. The system of claim 22, further comprising:
a supply of fuel;
a pump having a pump inlet operatively coupled to the supply of fuel and having a pump outlet;
a fuel injector having an injector input operatively coupled to the pump outlet and having an injector output operatively coupled to the adsorber input.

27. The system of claim 26, further comprising:
an igniter operatively coupled to the adsorber input.

28. An internal combustion engine aftertreatment system for treating exhaust gases exiting an engine, the system comprising:
a valve system having a valve input operatively coupled to the engine exhaust, a first valve output and having a second valve output;
a catalytic soot filter having a soot filter input operatively coupled to the valve system output and having a soot filter output;
an adsorber having an adsorber input operatively coupled to the soot filter output and having an adsorber output;

a bypass pathway having a bypass input operatively coupled to the second valve output and having a bypass output operatively coupled to the adsorber output; and a diesel oxidation catalyst having a DOC input operatively coupled to the adsorber output and to the bypass output and having a DOC output.

29. The system of claim 28, further comprising:

a temperature and lamda sensor having a sensor input operatively coupled to the valve system input.

30. The system of claim 28, further comprising:

an NOx sensor having an NOx sensor input operatively coupled to the adsorber output.

31. The system of claim 28, wherein the valve system comprises a proportional control 3-way valve.

32. The system of claim 28, further comprising:

a supply of fuel;

a pump having a pump inlet operatively coupled to the supply of fuel and having a pump outlet;

a fuel injector having an injector input operatively coupled to the pump outlet and having an injector output operatively coupled to the soot filter input.

33. The system of claim 32, further comprising:

an igniter operatively coupled to the soot filter input.

34. An internal combustion engine aftertreatment system for treating exhaust gases exiting an engine, the system comprising:

a valve system having a valve input operatively coupled to the engine exhaust, a first valve output and having a second valve output;

an adsorber having an adsorber input operatively coupled to the first valve output and having an adsorber output;

a bypass pathway having a bypass input operatively coupled to the second valve output and having a bypass output;

a catalytic soot filter having a soot filter input operatively coupled to the adsorber output and the bypass output and having a soot filter output;

a temperature and lamda sensor having a sensor input operatively coupled to the valve system input;

a supply of fuel;

a pump having a pump inlet operatively coupled to the supply of fuel and having a pump outlet; and a fuel injector having an injector input operatively coupled to the pump outlet and having an injector output operatively coupled to the adsorber input.

35. The system of claim 34, further comprising:

an igniter operatively coupled to the adsorber input.

36. The system of claim 34, further comprising:

an NOx sensor having an NOx sensor input operatively coupled to the adsorber output.

37. The system of claim 34, wherein the valve system comprises a proportional control 3-way valve.

* * * * *